F. HARDINGE.
CARRIAGE FEED MECHANISM FOR LATHES.
APPLICATION FILED NOV. 8, 1916.

1,285,693.

Patented Nov. 26, 1918.

Witnesses:
Albin C. Ahlbig.
Alfred S. Callaway

Inventor
Franklin Hardinge
By Williams, Bradbury
Attorneys

UNITED STATES PATENT OFFICE.

FRANKLIN HARDINGE, OF CHICAGO, ILLINOIS, ASSIGNOR TO HARDINGE BROTHERS, OF CHICAGO, ILLINOIS, A CORPORATION OF ILLINOIS.

CARRIAGE-FEED MECHANISM FOR LATHES.

1,285,693.  Specification of Letters Patent.  Patented Nov. 26, 1918.

Application filed November 8, 1916. Serial No. 130,127.

*To all whom it may concern:*

Be it known that I, FRANKLIN HARDINGE, a citizen of the United States, residing at Chicago, in the county of Cook and State of Illinois, have invented certain new and useful Improvements in Carriage-Feed Mechanism for Lathes, of which the following is a full, clear, concise, and exact description, reference being had to the accompanying drawings, forming a part of this specification.

My invention relates to carriage feed mechanism for lathes and particularly to devices for attaching a carriage feed rod or carriage lead screw to a driving shaft extending from the change gear or transmission casing, so as to prevent relative movement between the feed rod or lead screw and the driving shaft and to permit the rod or screw to be detached from the lathe, and substituted by another rod or screw having different pitch threads or having some characteristic different from the one removed.

In the preferred form of my invention I provide a driving shaft extending from the transmission or change gear casing having secured thereto a collar or sleeve projecting beyond the end of the driving shaft. The feed rod or lead screw is adapted to extend into the sleeve and is provided within the sleeve with a slot arranged to receive an expansible member. Means are provided, such as a tapered pin for connecting the expansible member with the sleeve and for expanding the member against the walls of the feed rod or lead screw, thus securely holding the rod or screw against relative movement between it and the driving shaft, which, of course, is necessary in the production of accurate work.

These and other objects of my invention are more clearly brought out in connection with the accompanying drawings, wherein—

Similar characters of reference refer to similar parts throughout the several views.

Figure 1:
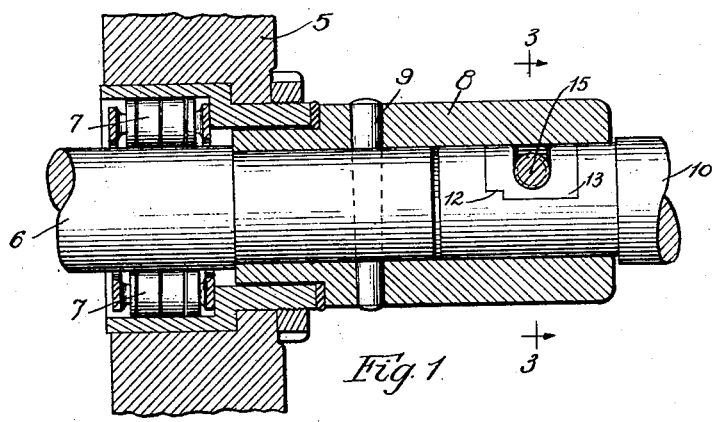
Figure 1 is a fragmentary cross-sectional view of a portion of the change speed gearing casing of the lathe, a driving shaft and a feed rod or lead screw, together with the device of my invention for attaching the rod or screw to the drive shaft.
Figure 2:
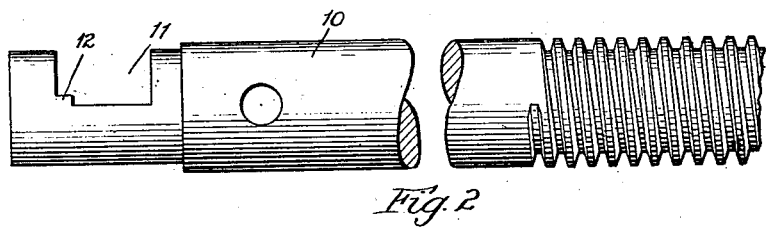
Fig. 2 is a fragmentary side view of a feed rod or lead screw provided with a slot for the reception of the expansible plug.

Referring first to Fig. 1, 5 illustrates a portion of the transmission or change gear casing usually located at the head stock end of the lathe. The driving shaft 6 extends from the change speed gearing within the casing 5, and is provided with the roller bearings 7 for journaling one end of the shaft in the gear casing. The outer end of the shaft 6 or the end which extends through the gear casing 5 has rigidly attached thereto a collar or sleeve 8. Any suitable means may be employed for attaching the sleeve 8 to the driving shaft 6, such for example as the tapered pin illustrated at 9, which extends through the sleeve 8 and through the driving shaft 6.

Figure 4:
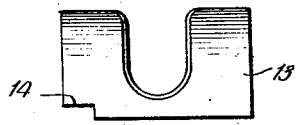
Fig. 4 is a detailed side elevational view of the expansible plug.

The sleeve 8 as most clearly illustrated in Fig. 1 extends beyond the end of the shaft 6 to receive the end of the feed rod or lead screw 10. That portion of the lead screw 10 which extends into the sleeve 8 is provided with a slot 11 which extends substantially at right angles to the axis of the lead screw. The slot 11 is preferably provided with the shoulder or ledge 12, the purpose of which will be presently described. The slot 11 provided in the lead screw is arranged to receive the expansible U-shaped plug 13 containing the cut-away portion 14 adapted to register with the ledge or shoulder 12 of the lead screw. The inner face of the U shaped member 13 is tapered, as illustrated in Fig. 4 and is arranged to coöperate with a correspondingly tapered pin 15, which extends through the aperture 16 provided in the sleeve 8 and into or preferably through the aperture 17 carried by the sleeve opposite the opening 16. The U shaped expansible plug 13 is tapered in the same direction in which the pin 15 is tapered, and to insure the proper positioning of the plug 13 within the slot 11 the ledge 12 and cut-away portion 14 are provided.

Figure 3:
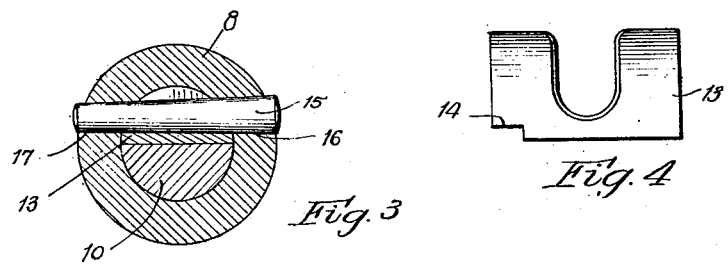
Fig. 3 is a cross-sectional view taken along the line 3—3 of Fig. 1 and looking in the direction indicated by the arrows.

In assembling the device the lead screw together with the expansible plug 13 is inserted into the sleeve 8 and the tapered pin 15 inserted through the aperture 16 of the sleeve through the expansible plug, as illustrated in Figs. 1 and 3, and through the aperture 17 of the sleeve. As the tapered pin 15 is driven in with a suitable tool the member 13 is caused to expand in the two directions parallel to the axis of the feed rod or lead screw 10 and moved in a direction toward the base of the slot 11. A tight connection is therefore made between the lead screw and the plug 13 as well as between the plug and the tapered pin 15, thus securely locking the feed rod or lead screw against relative movement between it and the driving shaft 6. If the lead screw 10 is to be removed for any reason the tapered pin 15 is removed by applying a suitable tool to the tapered end of the pin and forcing it back through the sleeve. The lead screw may then be removed and substituted by another. As most clearly illustrated in Figs. 3 and 4 the expansible plug 13 is of a size exactly the same as the slot or cut-away portion 11 of the lead screw with the exception of the central tapered slot provided in the plug.

Although I have described and illustrated the sleeve 8 as being secured to the driving shaft 6 and the lead screw as being provided with the connecting means of my invention, I wish it to be understood that the parts may be reversed, that is, the sleeve 8 may, if desired, be attached to the lead screw 10 and the driving shaft provided with the slot and locking plug.

Having thus described my invention, what I claim as new and desire to secure by Letters Patent of the United States is:

1. Carriage feed mechanism for lathes comprising a driving shaft, a collar secured thereto and projecting beyond the end thereof, a carriage feed rod projecting into said collar and provided with a slot within the collar, an expansible plug fitting in said slot, and a tapered pin extending through the collar and the plug for expanding the plug and securely holding the feed rod against movement relative to the collar.

2. A device of the class described comprising a driving shaft, a carriage feed rod provided with an opening, and devices connecting the driving shaft and the feed rod including an expansible plug fitting in the said opening, and means for expanding the plug and securely holding the feed rod against movement relative to the driving shaft.

3. A carriage feed mechanism comprising a driving shaft, a sleeve secured thereto and projecting beyond the end thereof, a carriage feed rod extending into said sleeve and being provided inside the sleeve with a slot extending substantially at right angles to the rod, an expansible plug fitting in said rod, said plug being provided with a tapered bore, and a correspondingly tapered pin extending through the sleeve and plug for expanding the plug and securely holding the feed rod against movement relative to the sleeve.

4. Carriage feed mechanism comprising a driving shaft, a sleeve secured thereto and projecting beyond the end thereof, a carriage feed rod extending into said sleeve and being provided inside the sleeve with a slot extending substantially at right angles to the rod, a U-shaped plug fitting in said slot, and a tapered pin extending through sleeve and plug for expanding the plug the sleeve and plug for expanding the plug and securely holding the feed rod against movement relative to the sleeve.

5. Carriage feed mechanism for lathes comprising a driving shaft, a sleeve secured thereto and projecting beyond the end thereof, a carriage feed rod extending into said sleeve and being provided inside the sleeve with a slot extending substantially at right angles to the rod, a tapered U shaped plug fitting in said slot, and a correspondingly tapered pin extending through the sleeve and plug for expanding the plug and securely holding the feed rod against movement relative to the sleeve.

6. Carriage feed mechanism for lathes comprising a driving shaft, a sleeve secured thereto and projecting beyond the end thereof, a carriage feed rod extending into said sleeve and being provided inside the sleeve with a slot extending substantially at right angles to the feed rod, a U shaped plug fitting in the slot and having its base at the bottom of the slot and its upper end rounded to correspond with the feed rod, and a tapered pin extending through the sleeve and the plug for expanding the plug and securely holding the feed rod against movement relative to the sleeve.

7. Carriage feed mechanism for lathes comprising a driving shaft, a sleeve secured thereto and projecting beyond the end thereof, a carriage feed rod extending into said sleeve and being provided inside the sleeve with a slot extending substantially at right angles to the feed rod, a tapered U shaped plug fitting in the slot and having its base at the bottom of the slot and its upper end rounded to correspond with the feed rod, and a correspondingly tapered pin extending through the sleeve and the U shaped plug for expanding the plug and securely holding the feed rod against movement relative to the sleeve.

8. A device of the class described comprising a driving shaft, a sleeve attached thereto and projecting beyond the end thereof, a driven rod extending into said sleeve and provided therein with an opening extending substantially at right angles to the driven shaft, and an expansible plug fitting in said opening for connecting the driven shaft with said sleeve.

9. Carriage feed mechanism for lathes comprising a driving shaft, a carriage feed rod, a sleeve secured to one of said members and extending beyond the end thereof to receive the other member, the said other member being provided with a slot extending substantially at right angles thereto, an expansible plug fitting in said slot, and a tapered pin extending through the sleeve and plug to expand the plug and for securely holding the feed rod against movement relative to the sleeve.

In witness whereof, I hereunto subscribe my name this 3rd day of November, A. D. 1916.

FRANKLIN HARDINGE.

Witnesses:
ROBERT F. BRACKE,
ALFRED S. CALLAWAY.

Copies of this patent may be obtained for five cents each, by addressing the "Commissioner of Patents, Washington, D. C."